United States Patent [19]

Powers

[11] 4,210,360

[45] Jul. 1, 1980

[54] RECREATIONAL VEHICLE

[76] Inventor: Thomas E. Powers, 6325 Ridge Ave., Cincinnati, Ohio 45213

[21] Appl. No.: 919,753

[22] Filed: Jun. 28, 1978

[51] Int. Cl.$^2$ ............................................. B60J 7/10
[52] U.S. Cl. ................................... 296/216; 296/165
[58] Field of Search ............ 296/137 R, 137 B, 23 R, 296/103, 99, 26, 137 C, 156, 188

[56] References Cited

U.S. PATENT DOCUMENTS

| | | | |
|---|---|---|---|
| 1,413,192 | 4/1922 | Ryder | 296/103 |
| 1,511,844 | 10/1924 | Shave | 296/103 |
| 1,763,088 | 6/1930 | Brohman | 296/103 |
| 1,839,727 | 1/1932 | Austin | 296/137 C |
| 1,882,360 | 10/1932 | Hilgenberg | 296/137 R |
| 2,926,042 | 2/1960 | Calthorpe | 296/137 B |
| 3,053,562 | 9/1962 | Farber | 296/137 B X |
| 3,619,001 | 11/1971 | Borskey | 296/137 B |
| 3,719,383 | 3/1973 | Ferro | 296/26 X |
| 3,731,970 | 5/1973 | Frank et al. | 296/23 R |
| 3,741,605 | 6/1973 | Lee | 296/103 X |
| 3,770,314 | 11/1973 | Borskey | 296/26 X |

FOREIGN PATENT DOCUMENTS 365929 1/1932 United Kingdom ...................... 296/26

*Primary Examiner*—John J. Love
*Assistant Examiner*—Milton L. Smith
*Attorney, Agent, or Firm*—Wood, Herron & Evans

[57] ABSTRACT

A dual roof recreational vehicle in which either a low profile roof or a high profile roof may be used interchangeably. Thus the vehicle may be stored in a standard height garage while the low profile roof is retained on the body. And when the vehicle is used on a trip, as for camping, the low profile roof is replaced by a high profile one. The two roofs are preferably made in multiple sections for ease of transferability and to provide more roof options, as for example, convertible roof or sun roof sections in both the high and low profile roofs.

6 Claims, 8 Drawing Figures

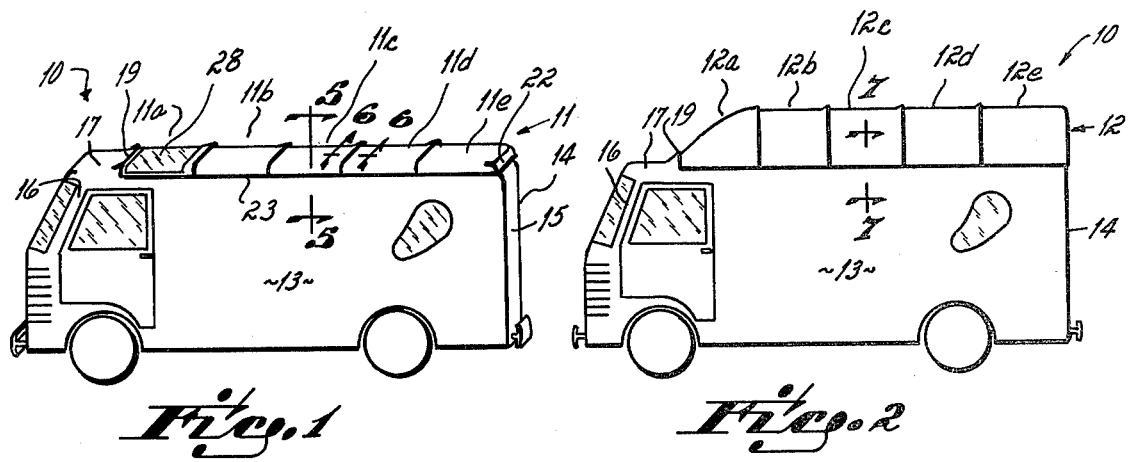
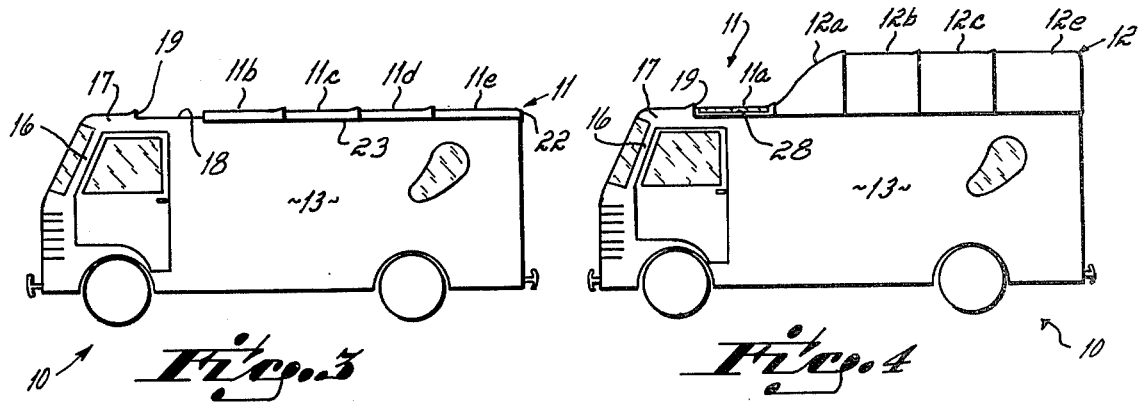
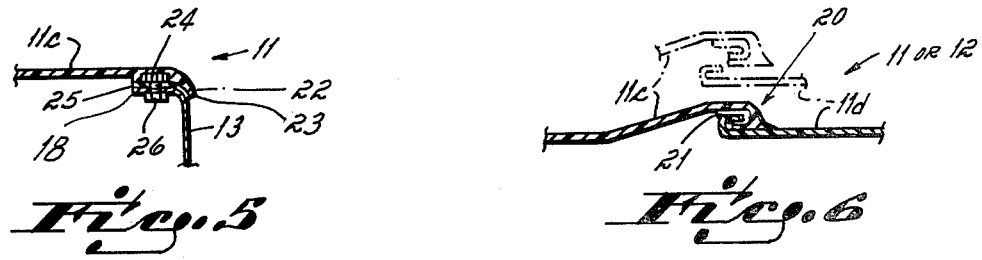
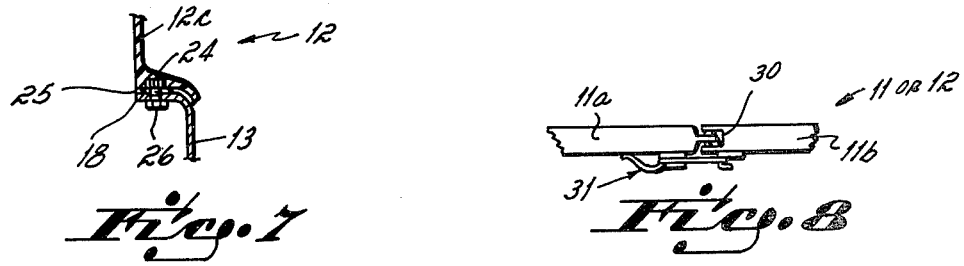

RECREATIONAL VEHICLE

This invention relates to recreational vehicle bodies and more particularly to van type recreational vehicles.

Recreational vans are generally used as either high passenger load capacity vehicles or as overnight camping and traveling vehicles. If used as passenger vehicles, they are generally low roof line vehicles in which the passengers must bend over or stoop to move around within the vehicle. If converted to a camper type of application, they oftentimes have the roof raised and/or the floor lowered so as to permit passengers to comfortably walk around in an upright position. As soon as a recreational van has a high profile roof permanently substituted for the original roof, it converts from an approximately eight foot height (measured from ground level) to an approximate ten foot high vehicle with the result that it is no longer capable of being stored in most family garages and consequently must sit outdoors when not in use. For many potential customers, this non-garageability is objectionable, with the result that they either do not purchase a recreational van or they compromise, and maintain it with a low roof with the result that they must crawl around inside to move between the cooking stove, refrigerator and closet, etc.

There has been a long standing need for a recreational van type of vehicle which is garageable or capable of storage within a conventional automobile storage garage and which is still capable of being used as a walk-around type of camper when the family travels.

To my knowledge there have been prior attempts to provide a low profile garageable van type vehicle with a high profile, walk-around camping top but these have all involved canvas or cloth type soft side wall "pop tops". These pop top type vehicles permit the top to be raised for camping but only when the vehicle is off the road or not moving. They are not intended nor are they capable of use with the top raised when the vehicle is moving.

It has therefore been an objective of this invention to provide a van type of recreational vehicle body which is both capable of being stored in an average height garage and yet which is still capable of on-the-road use as a high profile or walk-around camping type vehicle.

I have achieved this objective by providing a recreational van body with a pair of removable tops, one a low profile top for non-camping use, and the other a high profile top for camping and traveling use. By using the tops selectively and interchangeably, the van may be garaged and used around town with the low profile top and the high profile top may be interchanged with the low profile one for use on a long trip.

In the preferred embodiment, the vehicle van body comprises a body base and a pair of tops, one a low profile top and the other a high profile top. The body base has a floor, side walls and an inwardly turned flange at the top of the side walls. Each top has side walls, a ceiling, and an inwardly turned flange which rests atop the flange of the body base when the selected top is in place and in use on the body. Between the flanges of the base and top there is a seal and a releaseable lock, the seal being compressed when the releaseable lock secures the top to the base.

In a preferred embodiment, the low profile top is made in multiple sections, one forward of the other and located over the driver's seat of the vehicle. This top is so constructed that the front section may be left off and the rear section secured in place on the body base so that the missing section acts as an open convertible to permit of air flow through the open part of the roof.

In another preferred embodiment, both the low profile top and the high profile top are made in sections and the forward-most section of the low profile top is partially transparent so that it acts as a sun roof. In this embodiment, the low profile sun roof section may be used together with the remainder of high profile sections to obtain a sun roof van in a high profile walk-around recreational vehicle.

The primary advantage of this invention is that it enables for the first time, a high profile recreational van to be conveniently stored in a conventional garage and to still be used on camping trips or when traveling as a walk-around upright camping vehicle.

These and other objects and advantages of this invention will be readily apparent from the following description of the drawings in which:

FIG. 1 is a perspective view of a recreational van incorporating the invention of this application.

FIG. 2 is a side elevational view of the van of FIG. 1 but with the low profile roof replaced by a high profile roof.

FIG. 3 is a side elevational view of the van of FIG. 1 but with one low profile roof section omitted so as to convert the roof to a free air flow "convertible" roof.

FIG. 4 is a side elevational view of the van of FIG. 1 but with a portion of the low profile and a portion of the high profile roof utilized together to achieve a sun roof on the high profile roof vehicle.

FIG. 5 is a cross-sectional view taken on line 5—5 of FIG. 1.

FIG. 6 is a cross-sectional view taken on line 6—6 of FIG. 1.

FIG. 7 is a cross-sectional view taken on line 7—7 of FIG. 2.

FIG. 8 is a cross-sectional view of an alternative embodiment of joint between two roof sections.

Referring to FIG. 1, there is illustrated a conventional recreational van in which the standard roof has been removed and replaced with a new low profile, removable roof 11. This low profile roof is intended to be useable interchangeably with a high profile roof 12 illustrated in FIG. 2. The remainder of the vehicle, other than the roofs 11 and 12 is a standard commercially available recreational van, such as the vans now available from the major automobile manufacturing companies in the United States.

The vehicle 10 depicted in FIGS. 1 through 4 has a conventional body comprising side walls 13 and 14, a rear wall 15 and a cab or driver's section 16 having a roof 17. The side walls 13, 14 and rear wall 15, all terminate at their upper end in an inwardly turned flange 18 (FIG. 5). The low profile roof 11 or high profile roof 12 are alternately mounted upon and supported from the flange 18. The rear edge of the cab roof 17 terminates in a hook-shaped joint 19 which is identical to a joint 20 shown in FIG. 6 and as explained more fully hereinafter, is used to secure the roof 17 of the cab to either the low profile roof 11 or high profile roof 12.

Going now to FIG. 1, it will be seen that the low profile roof 11 comprises five sections 11a through 11e. These sections are preferably made from a molded fiberglass material but they could be made from any moldable material. Each section 11a–11e extends transversely across the vehicle and between flanges 18 on opposite sides of the vehicle body. At its leading and trailing edge, each of the sections 11a through 11d has one-half of the joint 20 molded therein so that a seal 21 may be secured between the two molded sections of the joint 20 to form a secure seal between them. The last section 11e has a downwardly curved end section 22 which fits over the flange 18 at the top of the rear panel 15 of the van body (see curved section 23 in FIG. 5).

In order to enable the roof sections 11a through 11e to be secured to the top flanges 18 of the sides 13 and 14 and rear 15 of the body's side walls, the lateral edges of each section are of increased thickness relative to the remainder of each section and have downwardly turned edges which match the curvature of the flange 18 on the side walls 13, 14 and 15. Preferably, nuts 24 are molded into the side edges 23 of each section 11a–11e and end section 22 of 11e. The lower side of each lateral edge section 23 and end section 22 preferably has a resilient seal 25 secured to it. The nuts 24 molded into the lateral edges of each of the sections 11a–11e and end section of 11e enable those sections to be threadably connected to the flanges 18 of the side walls 13, 14 and 15 by conventional threaded connectors 26 which extend upwardly through an aperture in the flange 18 and into the nuts 24. When the threaded connectors or bolts 26 are tightened into the nuts 24, the seal 25 between the roof section and the flange 18 is sandwiched between the two so as to form a tight weather seal between the two.

In the preferred embodiment, the forwardmost section 11a of the low profile roof 11 has a transparent glass center section 28 which enables this section to act as a sunroof over the cab of the vehicle. Of course, this sunroof is an optional feature which may or may not be included in one section of the roof. Additionally, the low profile roof 11 may be made in a greater or lesser number of sections depending upon the weight of each section and the ease with which the sections may be placed on and off of the body of the vehicle. The greater the number of sections, the easier it is for one person to handle a section and replace it on the vehicle.

Referring now to FIG. 2, there is illustrated the same vehicle 10 but with the low profile roof 11 removed and replaced by the high profile roof 12. In this embodiment there are also five sections to the high profile roof, each section of which is intended to replace one of the five sections of the low profile roof. These five sections are connected to the roof 17 of the cab of the vehicle and to the side walls 13, 14 and 15 in exactly the same manner as the sections 11a–11e of the low profile roof are attached to the flanges 18 of the side walls 13, 14 and 15. This connection is illustrated in FIG. 7. Specifically, in this embodiment, the threaded connectors 26 are threaded upwardly into nuts 24 which are molded into the edges of the roof sections 12a–12e. A seal 25 is secured to the underside of each flange of the roof sections 12a–12e so as to be sandwiched between the flange of the roof side walls and top edges of the van body walls. The joints 20 between the sections 12a through 12e of the roof are identical to the joints between the roof sections 11a through 11e.

The five sections 11a through 11e of the low profile roof are intended to be removed and replaced by the five high profile sections 12a through 12e of the high profile roof. Thus, the vehicle may be converted from a conventional low profile passenger van to a high profile camping type vehicle. The character of the vehicle is thus completely changed by interchanging these two roofs. The high profile is generally on the order of 18 to 24 inches higher than the low profile roof and enables passengers to walk around upright in the vehicle. The low profile vehicle, of course, does not permit of passengers walking around in the vehicle, but so long as the low profile roof is on the vehicle, the vehicle may be stored in garages of conventional door height. Consequently, many owners will use the low profile roof so long as the vehicle is in use as a passenger vehicle around town and will switch to the high profile roof before they depart on long trips, as for example, camping trips.

Referring now to FIG. 3 there is illustrated a third modification of the roof combination of FIGS. 1 and 2. In this modification, the front section 11a of the roof is completely omitted when the low profile roof is attached to the vehicle body. This enables the vehicle to be used as an open air vehicle in which air is free to flow through the open section which would otherwise be closed by the section 11a.

Referring now to FIG. 4, there is illustrated still a fourth combination of roof achievable with the dual roofs 11 and 12. In this modification, the first section 11a of the low profile roof, the one containing the transparent sunroof 28, is retained on the vehicle and four of the five high profile sections 12, 12b, 12c and 12e are utilized behind that low profile section 11a. This enables the high profile roof to incorporate a sunroof section over the driver's cab portion of the vehicle and still utilize the remainder of the vehicle as a high profile walk-around vehicle body.

Referring now to FIG. 8, there is illustrated another form of joint which may be utilized between two sections of the roof to replace the joint 20. In this modification, a rabbet joint is formed between the two sections 11a and 11b or 12a and 12b and a resilient seal 30 is sandwiched between the two sections of the rabbet joint. In this modification, a conventional pivoted bar type of latch 31 having a cam surface (not shown) is utilized between the two sections 11a and 11b of the body to pull the two sections tightly together so as to sandwich the seal 30 therebetween.

While I have disclosed in this application only two modifications of roofs utilized to achieve four different combinations of roof lines, persons skilled in this art will readily appreciate numerous changes which may be made without departing from the spirit of my invention. Manifestly, each of the high and low profile roofs could be made from greater or lesser number of sections and the sections could be formed so as to extend longitudinally rather than transversely of the vehicle. Additionally, the high profile roof 10 may include one or more sections having transparent plastic mounts forming sunroof sections as in the low profile roof of FIG. 1. Therefore, I do not intend to be limited except by the scope of my appended claims.

Having described my invention, I claim:

1. A recreational van vehicle body comprising,
   a cab section including a windshield,
   a body base having a floor, side walls extending from the floor to a level above the level of the windshield and a flange extending inwardly from the top of each of said side walls,
   a first removable body top having low profile side walls, a ceiling extending between said side walls, and a lateral edge extending outwardly from each of said side walls,
   a second removable body top having high profile side walls, ceiling wall extending between the top edge of said side walls, and said side walls including a flange extending outwardly from the bottom edge thereof, said side walls of said second removable body top being at least twice the height of said side walls of said first removable body top, sealing means located between said body base side wall flange and said body top side walls, locking means for interchangeably sealingly securing one of said first or second body tops to said body base, and each of said removable body tops comprising a plurality of unitary molded sections having joints molded therein along the leading and trailing edges thereof for interconnecting the sections one to the other and to the van body, said joints comprising a generally forwardly facing C shaped lip formed along the leading edge of said sections and a generally rearwardly facing C shaped lip formed in the trailing edge of said sections, said C shaped lips of said joints being sealingly interfitted and interengaged when said sections are assembled onto said body base.

2. The recreational van vehicle body of claim 1 in which said locking means comprises a threaded connector operable between said flange of said body base and said body tops.

3. The recreational van vehicle body of claim 1 in which the forwardmost section of at least one of said body tops may be removed to provide an open sun roof type of free air flow passage through the removed section of said top.

4. The recreational van vehicle body of claim 1 in which all of said sections of both of said body tops are adapted to extend transversely between opposite sides of said body base side walls when said sections are attached to said body base.

5. The recreational van vehicle body of claim 4 in which the forwardmost of said sections attached to said body base is a low profile section from said first removable body top and the remainder of said sections attached to said body base is of a high profile from said second removable body top.

6. A recreational van vehicle body comprising, a cab section including a windshield, a body base having a floor, side walls extending from the floor to a level above the level of the windshield and a flange extending inwardly from the top of each of said side walls, a first removable body top having low profile side walls, a ceiling extending between said side walls, and a lateral edge extending outwardly from each of said side walls, a second removable body top having profile side walls, a ceiling wall extending between the top edge of said side walls, and said side walls including a flange extending outwardly from the bottom edge thereof, said side walls of said second removable body top being at least twice the height of said side walls of said first removable body top, sealing means located between said body base side wall flange and said body top side walls, locking means for interchangeably sealingly securing one of said first or second body tops to said body base, and, each of said removable body tops comprising a plurality of unitary molded sections having joints molded therein along the leading and trailing edges thereof for interconnecting the sections one to the other and to the van body.

* * * * *

UNITED STATES PATENT AND TRADEMARK OFFICE
CERTIFICATE OF CORRECTION

PATENT NO. : 4,210,360
DATED : July 1, 1980
INVENTOR(S) : Thomas E. Powers

It is certified that error appears in the above—identified patent and that said Letters Patent is hereby corrected as shown below:

Column 2, line 54, "inwardly" should read -- upwardly --.

Column 4, line 67, after "walls," insert -- a --.

Column 6, line 19, after "having" insert -- high --.

Signed and Sealed this

Eleventh Day of November 1980

[SEAL]

Attest:

SIDNEY A. DIAMOND

Attesting Officer

Commissioner of Patents and Trademarks